United States Patent
Meier

(10) Patent No.: US 7,869,412 B2
(45) Date of Patent: Jan. 11, 2011

(54) POINT-CONTROLLED CONTENTION ARBITRATION

(75) Inventor: Robert C. Meier, Cuyahoga Falls, OH (US)

(73) Assignee: Cisco Technology, Inc., San Jose, CA (US)

( * ) Notice: Subject to any disclaimer, the term of this patent is extended or adjusted under 35 U.S.C. 154(b) by 740 days.

(21) Appl. No.: 11/749,408

(22) Filed: May 16, 2007

(65) Prior Publication Data
US 2007/0217385 A1 Sep. 20, 2007

Related U.S. Application Data

(63) Continuation of application No. 09/953,820, filed on Sep. 12, 2001, now Pat. No. 7,251,232.

(60) Provisional application No. 60/252,717, filed on Nov. 22, 2000.

(51) Int. Cl.
*H04Q 7/24* (2006.01)

(52) U.S. Cl. .................. 370/338; 370/352; 370/331; 370/337; 370/348; 370/355

(58) Field of Classification Search .............. 370/338, 370/352, 331, 337, 348, 465, 468, 355
See application file for complete search history.

(56) References Cited

U.S. PATENT DOCUMENTS

| | | | |
|---|---|---|---|
| 4,872,163 A | 10/1989 | Follett et al. | |
| 5,276,680 A | 1/1994 | Messenger | |
| 5,329,531 A * | 7/1994 | Diepstraten et al. | 370/347 |
| 5,621,732 A | 4/1997 | Osawa | |
| 5,673,031 A | 9/1997 | Meier | |
| 5,737,328 A | 4/1998 | Norman et al. | |
| 5,862,142 A | 1/1999 | Takiyasu et al. | |
| 5,903,373 A | 5/1999 | Welch et al. | |
| 5,940,771 A | 8/1999 | Gollnick et al. | |
| 6,002,918 A | 12/1999 | Helman et al. | |
| 6,049,533 A | 4/2000 | Norman et al. | |
| 6,067,297 A | 5/2000 | Beach | |
| 6,275,518 B1 | 8/2001 | Takahashi et al. | |
| 6,430,172 B1 | 8/2002 | Usui et al. | |
| 6,529,520 B1 * | 3/2003 | Lee et al. | 370/442 |
| 6,587,453 B1 | 7/2003 | Romans et al. | |
| 6,704,932 B1 | 3/2004 | Matsunaga et al. | |

(Continued)

OTHER PUBLICATIONS

Maarten Hoeben; "No Wires Needed"; May 10, 2000; IEEE P802.11.

(Continued)

*Primary Examiner*—Salman Ahmed
*Assistant Examiner*—Andrew C Lee
(74) *Attorney, Agent, or Firm*—Tucker Ellis & West LLP

(57) ABSTRACT

In an example embodiment, there is described herein a method for providing quality of service during a contention period. A tiered access protocol enables an Access Point to act as a channel arbitrator and gain control a channel during a contention period. The Access Point waits a specified amount of time before taking control of a channel for either transmitting an outbound frame or initiating Polled-Contention Free Bursts. In addition, a method for increasing the time span between Delivery Traffic Indication Message beacons by tracking when Wireless Stations are able to receive messages and instantly delivering messages to those Wireless Stations.

18 Claims, 2 Drawing Sheets

U.S. PATENT DOCUMENTS

| | | |
|---|---|---|
| 6,721,331 B1 * | 4/2004 | Agrawal et al. ............. 370/448 |
| 6,747,968 B1 * | 6/2004 | Seppala et al. ............. 370/338 |
| 6,791,996 B1 | 9/2004 | Watanabe et al. |
| 6,804,222 B1 | 10/2004 | Lin et al. |
| 6,813,260 B1 * | 11/2004 | Fogle ......................... 370/338 |
| 6,839,331 B2 * | 1/2005 | Rudnick ..................... 370/312 |
| 6,842,605 B1 | 1/2005 | Lappetelainen et al. |
| 6,865,609 B1 | 3/2005 | Gubbi et al. |
| 6,907,044 B1 | 6/2005 | Yonge, III et al. |
| 6,914,890 B1 | 7/2005 | Tobita et al. |
| 6,934,753 B2 | 8/2005 | Kim |
| 6,950,397 B1 * | 9/2005 | Ho et al. ..................... 370/235 |
| 6,970,422 B1 | 11/2005 | Ho et al. |
| 6,990,116 B1 * | 1/2006 | Young et al. ................ 370/445 |
| 7,031,287 B1 * | 4/2006 | Ho et al. ..................... 370/338 |
| 7,050,459 B2 | 5/2006 | Kandala |
| 7,095,754 B2 * | 8/2006 | Benveniste .................. 370/465 |
| 7,272,119 B2 * | 9/2007 | Rudnick et al. ............. 370/329 |
| 7,274,708 B2 * | 9/2007 | Benveniste .................. 370/445 |
| 7,664,072 B1 * | 2/2010 | Ho et al. ..................... 370/329 |
| 2002/0071448 A1 * | 6/2002 | Cervello et al. ............. 370/445 |
| 2002/0071449 A1 * | 6/2002 | Ho et al. ..................... 370/447 |
| 2003/0165140 A1 | 9/2003 | Tang et al. |

OTHER PUBLICATIONS

Mathilde Benveniste; "Tiered Contention"; Nov. 2000; IEEE P802.11.

Menzo Wentink; "Probabilistic DCF Versus Backoff DCF"; Nov. 2000; IEEE P802.11.

XP-002307525, "IEEE Standard for Local and metropolitan area network—Port-Based Network Access Control", LAN/MAN Standards Committee of the IEEE Computer Society, pp. 13-21.

Bernard Aboba, et al., XP-002307526, "IEEE 802.1X For Wireless LANs", Mar. 2000, Slides 1-27.

* cited by examiner

POINT-CONTROLLED CONTENTION ARBITRATION

CROSS-REFERENCE TO RELATED APPLICATIONS

This application is a continuation of U.S. application Ser. No. 09/953,820 filed on Sep. 12, 2001 now U.S. Pat. No. 7,251,232 which claims the benefit and priority of U.S. Provisional Application No. 60/252,717 filed Nov. 22, 2000.

BACKGROUND

Networks conforming to the Institute of Electrical and Electronic Engineers (IEEE) 802.11 protocol (Nov. 18, 1997) use two protocols, the DCF (Distributed Coordination Function) and PCF (Point Coordination Function) for channel arbitration. The DCF performs well under low load situations. The PCF is optimal under high load conditions. The DCF works better in networks where Basic Service Sets (BSSs) overlap, the PCF is ideally suited for networks where BSSs are carefully planned not to overlap. The DCF has a relatively low implementation complexity, whereas the PCF is reputed to be more complex to implement. The DCF does not allow explicit access control, the PCF does. The DCF efficiency drops considerably in densely populated BSSs, the PCF has no scaling problem.

Due to the inability of the PCF to work well under overlapping Basic Server Set (BSS) conditions and the high implementation complexity, the PCF has not yet been widely adopted in current 802.11 implementations. The demand for better medium efficiency and a versatile QoS (Quality of Service) platform, however, increased interest in this optional access mechanism of the 802.11 MAC (Media Access Control).

The hybrid nature of the 802.11 MAC has caused proposals to focus either on the DCF or the PCF. However, by only looking at the PCF and not considering the DCF overlooks the fact that the 802.11 MAC always spends some time under the DCF access mechanism rules and that the DCF is also an integral part of a PCF based system. The system always has to spend at least a small part of its time under the DCF. The PCF has the fundamental characteristic that a station can't access the medium unless explicitly polled. However, to be polled, the station must first make itself known to the Point Coordinator, which requires medium access. Therefore, a PCF based solution should support both contention-free and contention periods. A contention period is useful for bursty traffic, adjacent BSSs, probe requests, association and re-association requests, etc. Latency is introduced if the channel is overloaded in the contention period.

Delay sensitive applications, such as VoIP (Voice over Internet Protocol), require short DTIM (Delivery Traffic Indication Message) intervals (e.g. 30 milliseconds) to minimize CF (Contention Free) polling latency. A fast DTIM beacon rate wastes bandwidth because of the beaconing overhead and because contention-based transmissions cannot span the TBTT (target beacon transmission time). A fast DTIM beacon rate also requires power-save Wireless Stations (WSTAs) to wake up more often, for example to receive multicast frames and buffered unicast frames.

In installations with multiple QoS applications with different service rates, the DTIM beacon rate cannot match the sampling rate for each application. Actually, it is difficult to match the sampling rate for any application. It is not efficient to arbitrarily poll WSTAs in every CFP (Contention Free Period). Periodic polling is not optimal for intermittent traffic. For example, VoIP traffic can be intermittent due to silence suppression.

Depending on the 'load of the medium', the system may spend more or less time in the CFP. In a heavily loaded system, the system may spend the larger part in the CFP while a mildly loaded system may spend the larger part in the CP (Contention Period). The balance between the two access mechanisms is a function of the medium load. As a consequence, both access mechanisms must provide the same QoS capabilities. The transition between one access mechanism and the other must be a smooth one. This is especially a challenge in average loaded systems where the DCF efficiency is starting to breakdown while the PCF efficiency is not yet optimal. For the upper layer protocol (or application) the performance profile of the service should be linear over all medium conditions and this is something that should be considered when proposing a PCF based system. Therefore, when proposing PCF enhancements, one also to consider the interaction between the PCF and the DCF and the dynamics of the system as a whole under various medium load conditions.

PCF combines the ability of full medium control with optimal medium efficiency, without suffering from scalability problems. However, there are two issues that limit the use of the current PCF for QoS systems. Section 9.3.4 and specifically clause 9.3.4.1 of the IEEE 802.11 standard imposes strict rules upon the order in which stations are addressed or polled. This is undesirable in a QoS system. Secondly, there is no mechanism, other than the More-Data bit, that allows a station to communicate its queue states to the PC.

Another concern is that PCF and DCF applications do not always coexist well. The PCF model only supports "polled" inbound transmissions during a CFP. As a result long PCF-based CFPs can starve DCF-based stations. The problem is exacerbated when CFPs in overlapping BSSes must be scheduled to avoid CFP contention. PCF polling is appropriate for isochronous applications, but DCF is more appropriate for asynchronous data. It should not be assumed that PCF polling is used for all high-priority inbound transmissions.

OVERVIEW OF EXAMPLE EMBODIMENTS

Among those benefits and improvements that have been disclosed, other objects is and advantages of this invention will become apparent from the following description taken in conjunction with the accompanying drawings. The drawings constitute a part of this specification and include exemplary embodiments of the present invention and illustrate various objects and features thereof.

DESCRIPTION OF EXAMPLE EMBODIMENTS

In an example described herein is a contention-based channel access method where the channel access population is divided into two distinct groups; the first group is a set of channel access arbitrators, and the second group is the set of all other stations. Channel access is highly prioritized for the channel arbitrators so that an arbitrator can quickly gain control of a (e.g. heavily loaded) channel during a contention period and mitigate contention by directing (e.g. polling) which stations can access the channel.

Figure 1:
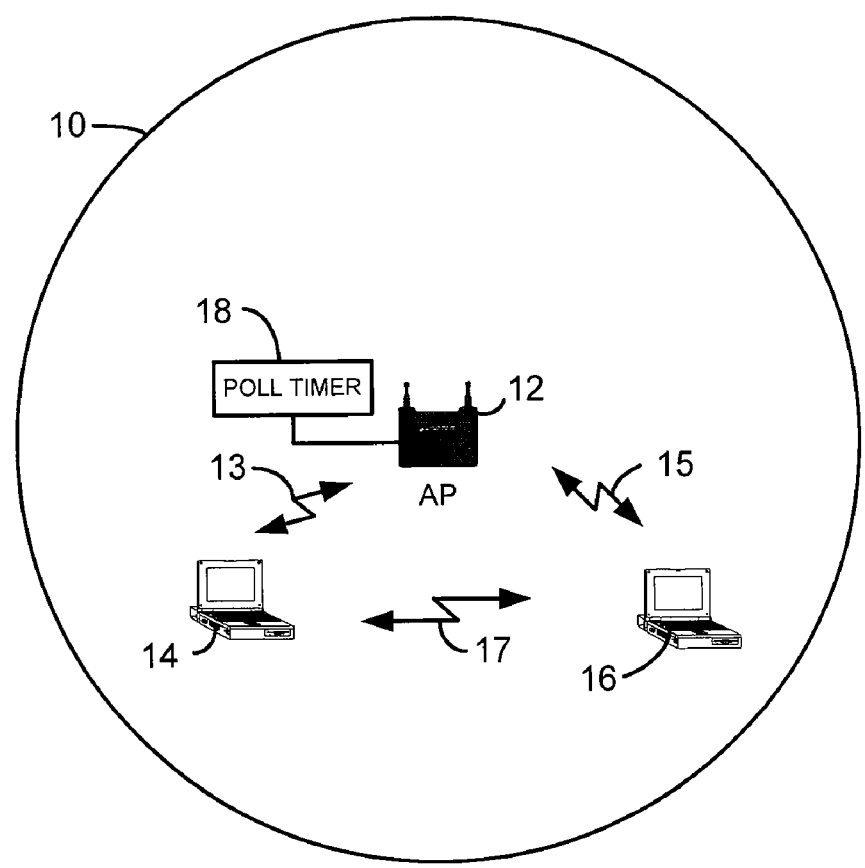
FIG. 1 is a block diagram of a system configured to implement an example embodiment.

Referring to FIG. 1, there is illustrated an example embodiment of a Basic Service Set 10. AP 12 functions as the channel arbitrator and is in communication with wireless stations (WSTAs) 14, 16 illustrated by 13, 15 respectively. WSTAs 14, 16 may also communicate with each other as represented by 17. The arbitrator 12, normally an Access Point (AP) or an Enhanced Access Point (EAP), monitors the service rate of a station within its basic service set 10. The service rate may either be for outbound transmissions from the arbitrator 12 to the station (e.g. station 14) or for inbound transmissions from the station 14 to arbitrator 12. Typically, the arbitrator 12 uses a poll timer 18 to track when a station needs to be serviced. After every communication 13 with the station 14 the poll timer 18 is reset. During light or medium loaded conditions, the workstation 14 should be able to communicate before the poll timer expires, thus obviating the need for the arbitrator to take control of the channel.

The arbitrator 12 gains control of the channel by sensing the channel being clear for a shorter time frame than that required for all other stations 14, 16 within the basic service set 10. In an example embodiment, the arbitrator 10 waits a maximum of a distributed is interframe space before reserving the channel. However, the arbitrator 10 may gain control of the channel during the contention period after the channel is idle for a short interframe space following an inbound transmission from a station to the arbitrator or a station to station transmission 17 that originates from a station (14 or 16) within the basic service set 10.

Once the arbitrator 10 gains control of the channel, it may send multicast transmissions to a plurality of stations 14, 16, send a unicast transmission to a station, or poll stations with time bounded applications and receive inbound transmissions from those stations. In an example embodiment, all the transmissions are contention free bursts that include one or more data frame transmissions.

Another example embodiment of this invention contemplates a multicast power-management enhancement that can be used to reduce the DTIM beacon rate. In 802.11 networks, access points buffer multicast frames and transmit those frames immediately following DTIM beacons, so that "power-save" stations can "sleep" between DTIM beacons without missing multicast transmissions. Some time-bounded applications require a rapid DTIM beacon rate to avoid latency. As a result stations must wake up more often and bandwidth is wasted because stations are prohibited from transmitting before a DTIM beacon.

Presently, outbound multicast transmissions are made only immediately after a Delivery Traffic Indication Message beacon. The access point must buffer outbound multicast frames between DTIM beacons. Because the arbitrator is monitoring station service rates, the arbitrator knows when those stations being monitored are active on the channel and available to receive data from the arbitrator. Thus, the arbitrator may send outbound messages independent of any beacons. By associating the active stations to multicast groups, it may determine when all of the stations in the multicast group are available to receive frames. Therefore, an arbitrator can wait until all of the stations of a multicast group are active and broadcast a multicast frame independent of the DTIM beacon. Because the arbitrator has the capability to gain control of a channel during the contention period, multicast frames for time bounded applications may be transmitted during the contention period, thus obviating the need for more frequent DTIM beacons. In the preferred embodiment, the arbitrator would request that all stations must operate in active mode to join an "active multicast group."

While the multicast transmission method can be utilized to increase power savings, it is also contemplated that this method can be used anytime a group of stations running a time bounded application needs to receive a multicast frame. Divorcing the broadcast of multicast frames from the DTIM beacon, especially for parameterized QoS wireless stations requiring frequent servicing, can result in a reduction of the DTIM beacon rate. Reducing the DTIM beacon rate has the additional benefit of easing channel congestion.

As with the power savings method, the access point buffers a multicast frame for a multicast group, associates the individual stations with their appropriate multicast groups, waits until every station of a multicast group is in an active mode, and broadcasting the frame.

In an example embodiment, there is disclosed a method for managing prioritized channel access. Prioritized channel access is required for parameterized and prioritized stations. "Parameterized stations" are QoS stations with flows that require guaranteed bandwidth and bounded delays. It is assumed that such stations will use a signaling protocol, for example Resource Reservation Protocol (RSVP) with subnet bandwidth management (SBM), to request a constant service rate. Prioritized stations are QoS stations that transmit frames with a priority higher than "best effort", without using a signaling protocol to set delay and bandwidth parameters.

In an example embodiment, the method contemplates utilizing an AP channel access arbitrator that monitors the service rate for "parameterized QoS stations" and initiates unscheduled Point-controlled Contention-free Burst ("P-CFB") polling, as required, during the contention period, to sustain a constant service rate for such stations.

WSTAs may optionally use a signaling protocol to establish service rate parameters. The access arbitrator can use channel load feedback function to estimate channel load and contention.

A P-CFB is essentially a contention-free burst that is extended to include PCF-like polling facilities. For outbound transmissions (e.g. transmission sent by AP 12), the channel access arbitrator 12 gains control of the channel and begins transmitting contention free bursts for the outbound transmissions. For inbound transmissions (transmissions to AP 12), the channel access arbitrator 12 gains control of the channel, polls the wireless station 14, and the wireless station's response is a contention free burst. Therefore, P-CFB can consist of one or more outbound transmissions, one or more polled inbound transmission, or any combination of inbound and outbound transmissions, separated by a Short interframe space (SIFS) time. A P-CFB is not associated with a DTIM beacon transmission and stations do not preset their Network Allocation Vector (NAV) for the maximum duration of a P-CFB.

In the Point Controlled Contention Arbitration (PCCA) model, WSTAs must support P-CFB polling and a functional interface that enables a signaling protocol to communicate service rate requirements to a bandwidth manager in the AP. In an example embodiment, it is intended that parameterized services can be implemented by transparently layering a signaling protocol on top of the 802.11e protocol stack in a WSTA. The use of a signaling protocol is optional.

Minimum AP requirements are as defined in the baseline proposal. An EAP need only support the level 1 Virtual Distributed Coordination Function (V-DCF) QoS protocol. An AP can optionally implement P-CFBs, CFPs, an overlap mitigation protocol, support for a QoS signaling protocol, and level 3 polling and TXOP (Transmission Opportunity) enhancements. An AP implements a signaling protocol and P-CFB polling to support a constant service rate for each parameterized station.

Carrier Sense Multiple Access (CSMA) channel efficiency can be very high, even under heavy load, if the contention population is small. The PCCA model attempts to divide the entire station population into a small EAP (e.g. AP 12) population and a non-EAP (e.g. stations 14, 16) station population, for channel access purposes, so that an EAP can deterministically gain access to the channel, in the contention period, to transmit outbound frames or initiate a P-CFB. The EAP maintains control of the channel during a P-CFB with the DCF Clear Channel Assessment (CCA) and DCF channel reservation mechanisms.

In one embodiment, the tiered channel access method, combined with some form of priority queuing, is all that is necessary to assure timely delivery of outbound high-priority unicast or multicast frames. CFPs can optionally be used to reduce contention, from hidden nodes, for outbound multicast transmissions associated with DTIM beacons.

For inbound unicast transmissions, a channel access arbitrator (e.g. EAP 12) monitors the service rate for stations and initiates polling, as required, to maintain a constant service rate for parameterized stations. Note that inbound transmissions, in a BSS 10, are unicast. In a simple implementation, the access arbitrator (e.g. AP 12) can maintain a "poll timer" 18 for each parameterized station (e.g. stations 14 and/or 16). In an example embodiment, a station 14, 16 is polled if the poll timer 18 expires and the poll timer 18 is reset each time the AP 12 receives an inbound frame from the station. The duration of the poll timer 18 can be set long enough so that polling is never used on lightly, or moderately loaded channels and short enough so that the minimum delay for the respective flow is not exceeded. Note that a station can be polled in either the optional contention-free period or the contention period.

An interactive voice session typically comprises of 2 fixed-rate intermittent flows. A flow periodically goes idle due to "silence suppression". For such applications, the channel access arbitrator can use a channel load feedback function to monitor the channel load. The arbitrator initiates P-CFB polling for such stations if 1) the poll timer has expired, and 2) the channel load is greater than the channel load threshold associated with the flow. On moderately loaded channels, the point controller will not waste bandwidth polling for inactive flows.

Streaming video applications typically generate a constant stream of variable-sized compressed frames. Note that a single arbitration algorithm can support both VoIP and streaming video, simply by setting the channel load threshold, for streaming video flows, to a low value (e.g. 0), to trigger P-CFB polling whenever the poll timer expires.

The use of the optional multi-poll mechanism, is not prohibited during a P-CFB. However, simple, explicit polling works better with variable rate flows, for example streaming video and explicit polling can help prevent interference from hidden nodes.

The point controller does not necessarily know the duration of an inbound transmission associated with a P-CFB poll. Therefore, the DCF channel reservation (i.e. in the Duration/ID field) in a P-CFB poll must be for a time slightly longer than the worst-case maximum fragment transmission time. A WSTA should adjust point controller channel reservations, as is appropriate. For example, a WSTA should cancel a point controller reservation, if it receives a unicast frame from the point controller, where the receiver address (RA) matches the WSTA address. A WSTA should shorten its reservation if receives a frame from the point controller, where the reservation is shorter, and the RA address does not match.

Simple P-CFB polling sequences, that consist of 1) an AP poll, 2) a W-STA data frame, and 3) and an AP ACK, work well in environments with hidden nodes. The reservation in the initial AP poll frame reserves the channel, in the coverage area of the AP, for the duration of the, possibly hidden, data transmission from the WSTA. The final AP ACK transmission cancels the reservation (e.g. which may exceed the duration of the, possibly null, data transmission).

The hidden node problem is exacerbated by WSTAs that change frequencies or wake up, sense the channel idle for a Distributed Interframe Space (DIFS) time, and transmit. Such WSTAs may miss an initial poll or CTS frame that preceded a transmission from a hidden WSTA. The hidden node problem can be partially addressed by limiting the maximum duration of inbound transmissions so that unicast transmission sequences consist of alternating AP transmissions and bounded WSTA transmissions. Interleaved AP polls, for example, can be used to sustain the channel reservation at the AP during P-CFB polling in the contention period. WSTAs initially sense the channel for a time slightly greater than the maximum transmission duration of an inbound fragment, where a fragment can be a partial frame or a whole frame, after first waking up or changing frequencies. Note that the channel reservation at the AP cannot be sustained for unbounded back-to-back TXOPs, with either delayed ACKs or no ACKs.

A WSTA "queue feedback mechanism" enables the point controller to determine the priority queue state in QoS stations, so that the point controller could use priority scheduling for inbound transmissions. Such a feedback mechanism would be useful for ordering polls and avoiding unnecessary polls. For example, the channel access arbitrator could reset its poll timer for a station if an ACK from the station indicated that it did not have data queued.

It might also be useful to include a "priority token" on outbound unicast data frames. For example, a QoS station could respond to an outbound unicast transmission, where the RA address matched the station address, with an inbound transmission, with a piggybacked ACK, if it had an equal or higher priority data frame queued. Such a mechanism would be useful for maintaining a constant service rate, without explicit polling, for applications with constant bi-directional flows (i.e. interactive voice without silence suppression).

In an example embodiment, the following channel access rules are used to implement the tiered channel access method during the contention period. An EAP (such as AP 12) can use the tiered access method to gain control of the channel for the transmission of any outbound frame (i.e. beacon, data, and management frames) or to initiate a P-CFB. An EAP can access the channel during the contention period (CP) after the channel is idle for a SIFS time following an inbound or WSTA-to-WSTA transmission sequence initiated by a WSTA within the BSS controlled by the EAP. Second, Contention Window Minimum (CWmin) values can be set differently for EAPs and WSTAs to prioritize EAP channel access, as defined in the baseline proposal. Third, an EAP senses the channel idle for a PIFS time before initiating the post-backoff following a successful or unsuccessful single-frame or burst transmission. QoS WSTAs and legacy WSTAs sense the channel idle for a DIFS time. Fourth, an EAP senses the channel idle for a PIFS time before restarting its backoff countdown, following a busy channel sense. Fifth, the configuration variable that controls the maximum duration of a P-CFB is the same as the variable that controls the maximum duration of an AP contention-free burst, as defined in the baseline proposal. Sixth, the DCF access mechanisms (channel reservation and CCA) are used to control the channel during a P-CFB. Bit 15 is set to 0 in the Duration/ID field, in a frame transmitted during a P-CFB, to indicate that the field contains a valid channel reservation value.

It has been noted that 802.11 CSMA "slot" times can be ambiguous. In the contention period, stations that are waiting to access a busy channel must sense the channel idle for a fixed time before restarting the backoff countdown. In the integrated mode, the idle sense time is a PIFS time for EAPs and a DIFS time for other WSTAs. The end of a transmission provides a "slot synchronization point" for stations waiting to access the channel. The efficiency of a CSMA algorithm can be greatly increased if stations transmit on slot boundaries (i.e. following the end of a transmission). However, the present invention is not limited to this method.

An aspect of an example embodiment is power management. The PCCA model adheres to the channel access rules defined in the 802.11 standard and the baseline proposal. The baseline proposal removes the restriction that buffered multicast/broadcast frames must be sent immediately following a DTIM beacon. If "strict ordering" is not enabled, then the current 802.11 standard specifies that an AP must buffer all outbound multicast frames and deliver them immediately following a DTIM beacon. Therefore, short DTIM intervals are employed to support multicast applications that cannot tolerate delays.

The baseline proposal requires that QoS WSTAs must be CF-Pollable. Therefore, QoS power-save WSTAs do not use the Power Save Poll (PS-Poll) mechanism for the delivery of outbound buffered messages. Instead, a QoS PS WSTA must adhere to the existing standard for CF-Pollable stations. That is, it stays awake, after it receives a DTIM beacon with its association identifier (AID) bit set on, until either it receives a unicast frame with the more bit set off, or a Traffic Indication Map (TIM) with its AID bit set off.

It is generally assumed, but not required, that QoS WSTAs with active flows will operate in active mode, because a point controller cannot successfully poll a WSTA that is in power-save mode. The baseline proposal defines "awake-time epochs" that can, optionally, be used to set an awake-time window for periodic polling and/or outbound data transmissions. However, awake-time epochs introduce complexity for P-CFB polling and PCF polling. If power management must be supported, it would be simpler to schedule P-CFB polls for power-save parameterized WSTAs, if such WSTAs used automatic power-save intervals, where power-save intervals are defined as follows: Such a power-save WSTA can remain in power-save mode for, at most, the duration of its "automatic power-save interval", following an inbound transmission, where the duration is selected to match the WSTAs inbound transmission rate. The WSTA must operate in active mode, after a power-save interval expires, until the end of the next polling sequence or inbound transmission. The point controller can simply adjust the duration of the poll timer, for a WSTA, so that it is greater than the sleep-time window duration. The point controller can then poll a WSTA and/or deliver outbound buffered data for a WSTA when the poll timer expires.

If "strict ordering" is not enabled, then the current 802.11 standard specifies that an AP buffers outbound multicast frames and delivers them immediately following a DTIM beacon. Therefore, short DTIM intervals are necessary to support multicast applications that cannot tolerate delays.

A layer 2 multicast group is typically associated with a single higher layer application such as example streaming video. An example embodiment supports "power-save" and "active" multicast addresses, where a multicast address is classified as "power-save" if any station in the multicast group is in power-save mode. Then outbound frames destined to an "active" multicast RA address can be delivered immediately. Therefore, the DTIM interval can, potentially, be much longer. Note that a multicast registration protocol (i.e. GMRP) is required to associate multicast addresses with stations.

It should be noted that outbound multicast transmissions are more susceptible to problems associated with inter-BSS contention and hidden nodes because multicast frames are not retransmitted, for example after a collision with a hidden node, and the DCF channel reservation mechanisms cannot be used for multicast frames. In the method of an example embodiment, CFPs are primarily used to increase the reliability for multicast transmissions. A CFP scheduling algorithm can be used to prevent CFPs in adjacent BSSes from colliding.

In a single-BSS environment, the tiered access method enables an EAP to quickly access the channel in the contention period, with a worst-case latency equal to the maximum duration of a 2304-byte transmission sequence. Note that the tiered channel access method allows the EAP to use CWmin values of 0 in the absence of channel contention from other APs. The EAP uses the DCF CCA and DCF channel reservation mechanisms to maintain control of the channel during a P-CFB. SIFS frame spacing is used for both P-CFBs and WSTA CFBs. The maximum duration of a P-CFB can be increased to improve channel efficiency. Therefore, the example embodiment is comparable to a PCF-based solution with respect to determinism and channel efficiency.

Networks with multiple and overlapping BSSes may have problems with hidden CFP's or hidden nodes. A "hidden CFP" is a CFP in a first BSS where the point controller is not within the range of a station in a second neighboring BSS. Likewise, a "hidden node" is a station in a first BSS that is not within the range of the point controller for a CFP in a second neighboring BSS.

In environments with multiple, overlapping BSSes, inter-BSS contention is reduced and spatial reuse is increased by relying on short randomly-spaced DCF-based P-CFBs, with short localized reservations, rather than long scheduled PCF-based CFPs. The CFP rate can be decreased, and the inter-DTIM period can be increased because the CFP rate is independent of the application sampling rates.

In networks with overlapping BSSs in the same Extended Service Set (ESS) or multiple ESSs, a CFP for a BSS is not completely contention-free unless all stations, in any neighboring BSS, that are in-range of any active stations in the BSS, set their NAV for CFPMaxDuration for the CFP. Therefore, the total "reservation area" for a CFP can be very large compared to the coverage area of the point controller for the BSS. In contrast, the reservation area for a P-CFB unicast transmission sequence is limited to the coverage area of the respective stations and the reservation is cancelled when the transmission sequence ends.

Figure 2:
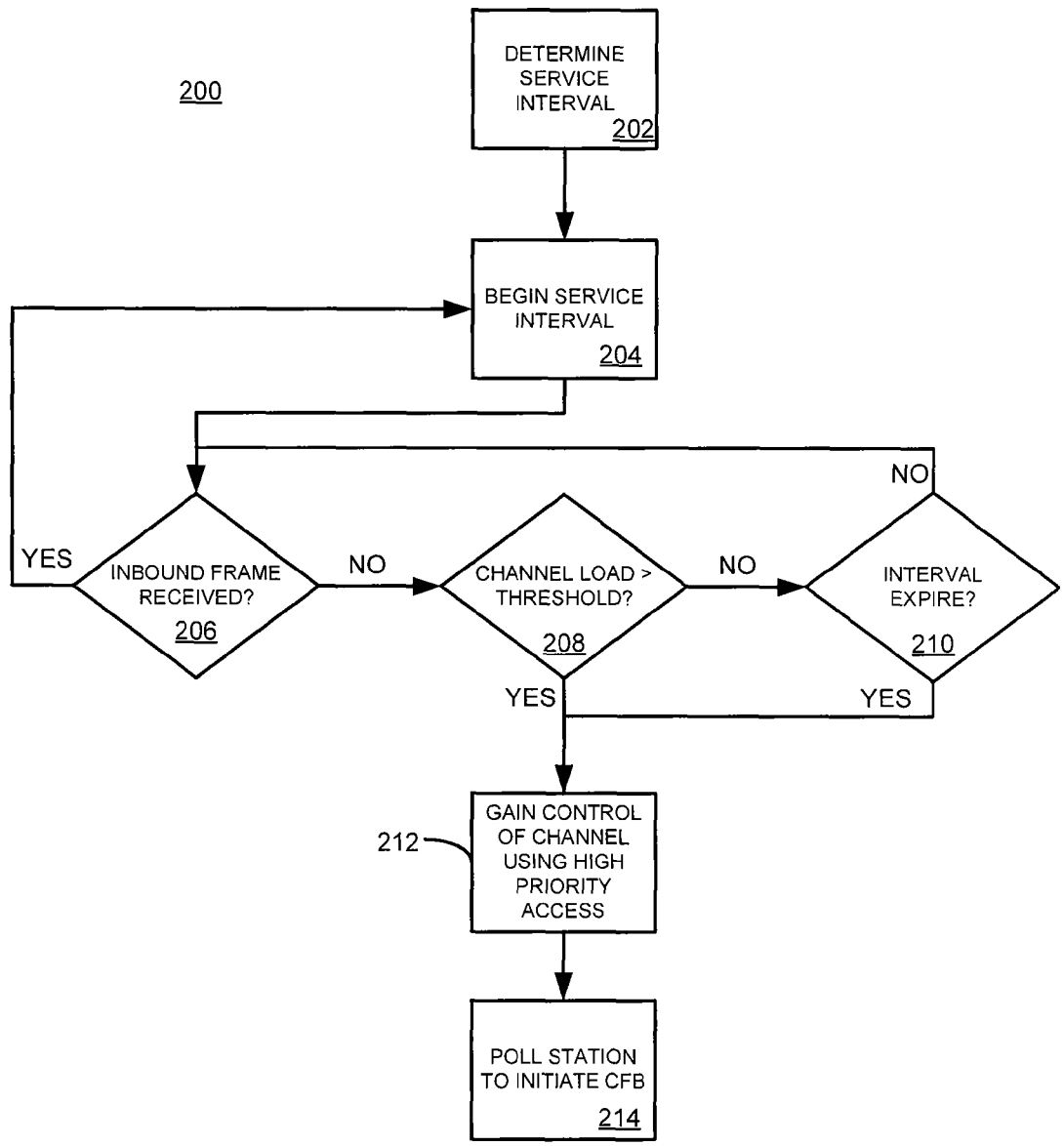
FIG. 2 is a flow diagram illustrating an example methodology.

Referring now to FIG. 2, there is illustrated a methodology 200 in accordance with an aspect of the present invention. As described hereinbefore the point coordinator (e.g. an AP such as AP 12 in FIG. 1) determines a time interval for which a station must be serviced, which is shown at 202. As stated hereinbefore, the point coordinator starts a poll timer (begin service interval as shown at 204). At 206, if an inbound frame is received (YES), the service interval re-starts. Otherwise (NO), at 208, a determination is made whether the channel load exceeds a predetermined threshold. At 210 a determination is made whether the interval expired. If either the channel load exceeds the predetermined threshold at 208 (YES) or the interval expires at 210 (YES), at 212 the point coordinator gains control of the channel using high priority access. As stated hereinbefore, the point coordinator can gain control of the channel by waiting an SIFS time period following an inbound frame or a WSTA to WSTA transmission sequence initiated by a WSTA within the BSS. After a successful or unsuccessful single frame or bust transmission sent by the point coordinator, or after a busy channel sense, the point coordinator waits for the channel to be idle a PIFS time before gaining control of the channel.

The invention claimed is:

1. A method, comprising: determining a predetermined interval corresponding to a service rate for providing quality of service; waiting for the predetermined interval to expire; reserving a channel for a predetermined time period during a contention period using high priority access; and polling to initiate a point controlled contention free burst during the contention period while the channel is reserved, wherein the polling comprises sending an outbound unicast data frame with a priority token, the priority token instructing a receiving station to send an inbound frame with an equal priority or a greater priority than the priority token.

2. The method according to claim 1, the reserving a channel further comprising sensing the channel for a sensing time period by an arbitrator before reserving the channel, wherein the arbitrator senses the channel for a sensing time period before reserving the channel that is shorter than that required for all other stations.

3. The method according to claim 2, wherein the sensing time period is a point coordination interframe space.

4. The method according to claim 3, wherein the sensing time period is a short interframe space after receiving an inbound transmission.

5. The method according to claim 4, wherein the sensing time period is a short interframe space after a station to station transmission that originates within a basic service set.

6. The method according to claim 1, further comprising determining a channel load, wherein the polling to initiate a point controlled contention free burst is responsive to determining the channel load exceeds a predetermined threshold.

7. The method according to claim 1, further comprising:
receiving an inbound frame; and
re-starting the waiting for the predetermined interval to expire responsive to receiving the inbound frame.

8. The method according to claim 1, further comprising the steps of:
determining whether a channel load exceeds a predetermined level;
reserving the channel using high priority access responsive to determining the channel exceeds the predetermined level; and,
polling to initiate a point controlled contention free burst responsive to determining the channel exceeds the predetermined level during the contention period.

9. The method according to claim 8, wherein the reserving a channel further comprising sensing that the channel is idle for one of the group consisting of a point coordination interframe space and a short interframe space.

10. The method according to claim 1, wherein an arbitrator gains control of the channel by sensing the channel is clear for a shorter time frame than all other stations within a basic service set.

11. The method according to claim 1, further comprising receiving at least one data frame in the point controlled contention free burst during the contention period while the channel is reserved responsive to the polling.

12. The method according to claim 1, wherein the predetermined time period is longer than a worst-case maximum fragment transmission time.

13. An apparatus, comprising: an access point configured to wirelessly communicate with at least one station over a channel within a basic service set; wherein the access point is configured to determine a predetermined interval corresponding to a service rate for providing quality of service to a wireless station; wherein the access point is configured to wait for the predetermined interval to expire; wherein the access point is responsive to the predetermined interval expiring to reserve the channel for a predetermined time period during a contention period using high priority access; and wherein the access point is configure to poll the station to initiate a point controlled contention free burst during the contention period while the channel is reserved, where the access point is configured to send an outbound unicast data frame with a priority token, the priority token instructing a receiving station to send an inbound frame with an equal priority or a greater priority than the priority token.

14. The apparatus according to claim 13, further comprising:
the access point is configured to determine a channel load;
wherein the access point is configured to employ polling to initiate a point controlled contention free burst responsive to determining the channel load exceeds a predetermined threshold.

15. The apparatus according to claim 13 further comprising the access point is configured to receive at least one data frame in the point controlled contention free burst during the contention period while the channel is reserved responsive to the polling.

16. The apparatus according to claim 13, wherein the access point is configured to gain control of the channel by sensing the channel is clear for a shorter time frame than all other stations within the basic service set.

17. The apparatus according to claim 13, further comprising:
the access point is configured to wait for the channel to be clear a sensing time period before initiating polling;
wherein the sensing time period is a short interframe space after receiving an inbound transmission, the sensing time period is a short interframe space after a station to station transmission that originates within the basic service set, otherwise the sensing time period is a point coordination interframe space.

18. The apparatus according to claim 13, further comprising:
a poll timer coupled to the access point, the poll timer is set to the predetermined interval for the station;
wherein the access point is responsive to receiving an inbound frame from the station to reset the poll timer to the predetermined interval.

* * * * *